United States Patent [19]
Blanding

[11] Patent Number: 6,064,505
[45] Date of Patent: May 16, 2000

[54] METHOD AND APPARATUS FOR MOVABLY SUPPORTING A REFLECTING MEMBER OF A FOCUSING APPARATUS

[75] Inventor: Douglass L. Blanding, Rochester, N.Y.

[73] Assignee: Eastman Kodak Company, Rochester, N.Y.

[21] Appl. No.: 09/192,971

[22] Filed: Nov. 16, 1998

[51] Int. Cl.$^7$ ................................................. G02B 26/08
[52] U.S. Cl. ........................................ 359/224; 359/833
[58] Field of Search .................................. 359/224, 431, 359/831, 833, 834, 835, 836

[56] References Cited

U.S. PATENT DOCUMENTS

| | | | |
|---|---|---|---|
| 3,356,968 | 12/1967 | Battles et al. | 359/831 |
| 4,538,882 | 9/1985 | Tanaka et al. | 359/824 |
| 4,720,088 | 1/1988 | Tamura | 267/158 |
| 4,763,967 | 8/1988 | Schermer | 359/210 |
| 5,317,552 | 5/1994 | Yamasaki | 359/824 |
| 5,561,648 | 10/1996 | Song | 359/813 |
| 5,594,820 | 1/1997 | Garel-Jones et al. | 385/22 |

*Primary Examiner*—Cassandra Spyrou
*Assistant Examiner*—Euncha Cherry
*Attorney, Agent, or Firm*—David A. Novais; Nelson Adrian Blish

[57] ABSTRACT

A support assembly for supporting a reflecting member of a focusing apparatus utilizes a flexure arrangement. The reflecting member can be in the form of a movable prism, and the flexure arrangement can include a pair of horizontal flexures in the form of sheets that support the moving prism of the focusing apparatus. The flexure arrangements permit the movement of the moving prism in a first direction relative to fixed prisms, fibers and lenses, while preventing or minimizing unwanted tipping, tilting or rotation of the movable prism. In one embodiment of the support assembly, the flexure arrangements can be symmetrically arranged on opposites sides of the movable prism, and in a further embodiment of the present invention, a further flexure arrangement can be arranged to provide for an increased range of motion of the movable prism.

14 Claims, 5 Drawing Sheets

METHOD AND APPARATUS FOR MOVABLY SUPPORTING A REFLECTING MEMBER OF A FOCUSING APPARATUS

CROSS-REFERENCE TO RELATED APPLICATIONS

The present application is related to co-pending U.S. patent application Ser. No. 08/865,792 filed May 30, 1997, by Joshua M. Cobb and David F. Hall, entitled METHOD AND APPARATUS FOR FOCUSING.

FIELD OF THE INVENTION

The present invention relates to a support assembly for a focusing apparatus, a focusing apparatus, as well as a method of movably supporting a reflecting member such as a prism of the focusing apparatus.

BACKGROUND OF THE INVENTION

In imaging systems such as a thermal printer in which a colorant donor element is placed over a medium for receiving an image, a focus position can vary due to various characteristics of the imaging system. For example, the flatness of the colorant donor material and the roundness of an imaging drum of the thermal printer can effect focus position. This creates the need for changing a focus position without compromising image quality. In the above-mentioned co-pending U.S. patent application Ser. No. 08/865,792, reflecting members or surfaces comprised of prisms are disclosed. In this arrangement, a focus distance from a laser to a donor can be changed without moving either the lens or the donor, by providing for a movement of one prism with respect to three stationary prisms.

FIG. 1 illustrates a focusing apparatus 10 such as shown in co-pending U.S. patent application Ser. N0 08/865,792. As illustrated in FIG. 1, focusing apparatus 10 includes reflecting members in the form of a first prism 11, a second prism 20, a third prism 30 and a fourth prism 40. Prisms 11, 30 and 40 are preferably cemented together utilizing suitable bonding material such as UV curable adhesives.

As further illustrated in FIG. 1, a fiber array 50 is located at a face 12 of prism 11 and light is reflected off of an interface 14 of prism 11 and prism 40. This light then enters prism 20 through its hypotenuse 22 and is reflected off first face 24 and second face 26 of prism 20. Light exits hypotenuse 22, reflects off of interface 32 of prisms 30 and 40 and exits prism 30 as it travels to a lens 60.

As disclosed in co-pending U.S. patent application Ser. No. 08/865,792, a focus shift can be produced by moving prism 20 relative to symmetric group of prisms 11, 30 and 40. When moving prism 20 in vertical direction 5 (Y axis), it is important that no other motion, such as tipping, tilting or movement in a direction parallel to lens 60 and optical axis 6 (x-axis) be incidentally allowed to occur.

U.S. Pat. No. 4,763,967 discloses an arrangement for supporting a lens. However, in this patent, the support makes up part of a resonant system for maintaining the natural frequency of movement of the lens, as opposed to forming a part of an assembly that permits a controlled movement of a reflecting member, such as a prism, along a first axis, or part of an assembly which permits a controlled movement of a prism along a first axis relative to a further prism and/or lens. Additionally, suspension or supporting systems such as disclosed in U.S. Pat. Nos. 4,538,882 and 4,720,088 permit two degrees of freedom. However, when moving a prism such as discussed above, it is important that the prism move in one direction without tipping or tilting.

SUMMARY OF THE INVENTION

The present invention provides for a support assembly of a focusing apparatus which overcomes the drawbacks noted above, and utilizes flexures to support a moving reflecting member such as a prism relative to other prisms and/or a lens of a focusing apparatus. The flexures of the support assembly of the present invention permit a motion of the prism while reducing unwanted rotations and tilting. The support assembly of the present invention is capable of moving prism 20 of FIG. 1 in a controlled manner without tipping, rotation or tilting.

In the focusing apparatus of the present invention, a reflecting member in the form of a prism is supported for focusing movement by a series of parallel flexures. In one embodiment of the present invention, the parallel flexures can be symmetrically arranged on opposite sides of the prism. In a further embodiment, a further pair of flexures can be arranged to extend the amount of movement of the movable prism in a direction perpendicular to an optical axis, so as to compensate for any foreshortening caused by the symmetrical pairs of flexures.

The present invention provides for a support assembly for a focusing apparatus which comprises a flexure arrangement that supports a reflecting member of the focusing apparatus and permits a movement of the reflecting member in a first direction.

The present invention further provides for a focusing apparatus which comprises at least one reflecting member; and a flexure arrangement that supports the at least one reflecting member and permits a movement of the at least one reflecting member in a first direction.

The present invention further provides for a support assembly for a focusing apparatus which comprises a support member attached to a reflecting member of the focusing apparatus for supporting the reflecting member; and a flexure arrangement that extends from the support member to a fixed member. The flexure arrangement permits a movement of the reflecting member in a first direction.

The present invention further provides for a support assembly for a focusing apparatus which comprises a first support member attached to a first end of a reflecting member of the focusing apparatus; a first flexure arrangement that extends from the first support member to a first fixed member; a second support member attached to a second end of the reflecting member; and a second flexure arrangement that extends from the second support member to a second fixed member. The first and second flexure arrangements permit a movement of the reflecting member in a first direction.

The present invention further provides for a support assembly for a focusing apparatus which comprises a first support member attached to a first end of a reflecting member of the focusing apparatus. A second support member attached to a second end of the reflecting member; a first flexure arrangement that extends from one of the first and second support members to a movable member; a second flexure arrangement that extends from the other of the first and second support members to a first fixed member; and a third flexure arrangement that extends from the movable member to a second fixed member. The first, second and third flexure arrangements permit a movement of the reflecting member in a first direction.

The present invention further provides for a method of movably supporting a reflecting member of a focusing apparatus which comprises the steps of providing first and second flexure arrangements on opposing sides of the reflecting member so as to permit a movement of the reflecting member in a first direction; and providing a third flexure arrangement relative to one of the first and second flexure arrangements to permit an increase in a distance that the reflecting member moves in said first direction.

BRIEF DESCRIPTION OF THE DRAWINGS

FIG. 2b is a schematic illustration showing movements permitted by flexures of the support assembly of FIG. 2a;

FIG. 2c is a further schematic illustration showing the forces applied to the support assembly of the embodiment of FIG. 2a;

DETAILED DESCRIPTION OF THE INVENTION

Figure 1:
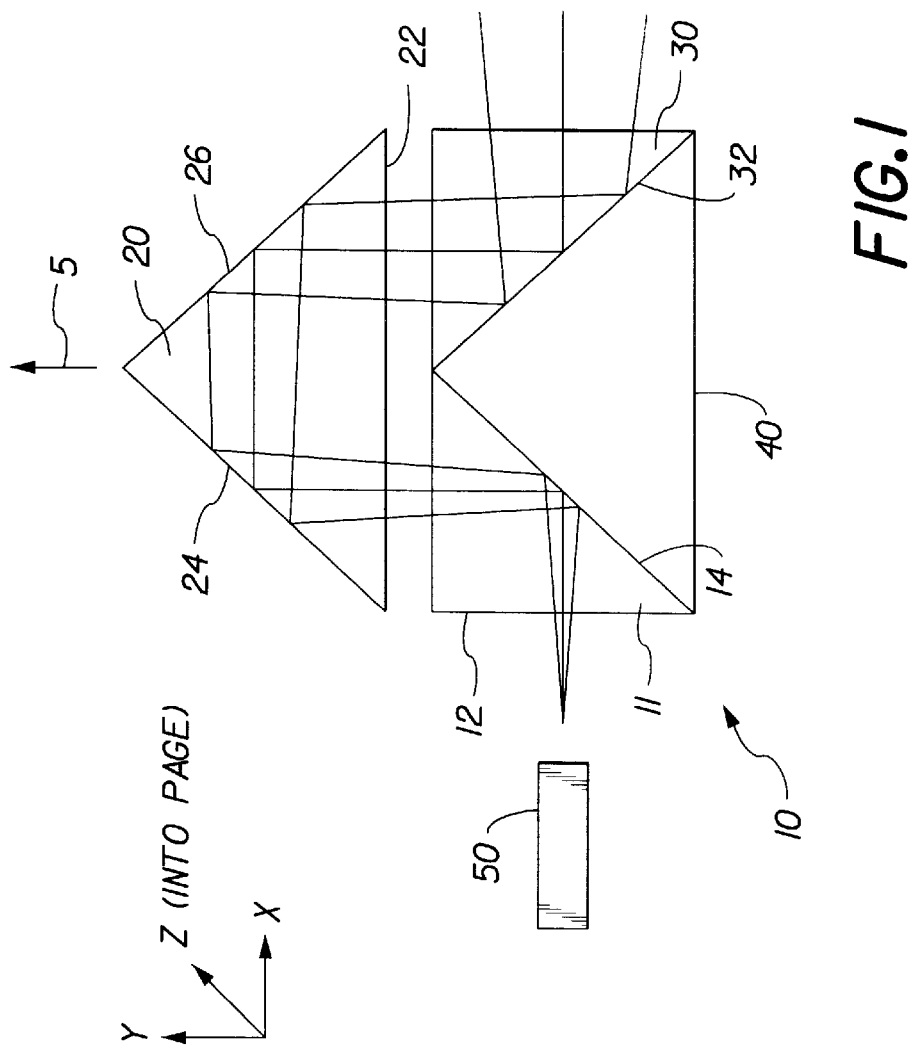
FIG. 1 illustrates an elevational view of a focusing apparatus which is applicable to the present invention.

Referring now to the drawings, wherein like reference numerals represent identical or corresponding parts throughout the several views, as noted above, FIG. 1 illustrates a focusing apparatus 10 which includes optical fibers 50, cemented and fixed reflecting members in the form of prisms 11, 30 and 40, a lens element 60 and a movable reflecting member in the form of prism 20. For focus shift, prism 20 is movable relative to cemented prisms 11, 30, 40, as well as lens element 60 and optical fibers 50. More specifically, prism 20 is movable in a vertical direction 5 along the Y axis as shown, which is perpendicular to optical axis 6.

As further described above, it is important that while moving prism 20 in the vertical direction, no other motion, such as tipping, tilting or movement in a direction parallel to optical axis 6 be allowed to occur.

Figure 2A:
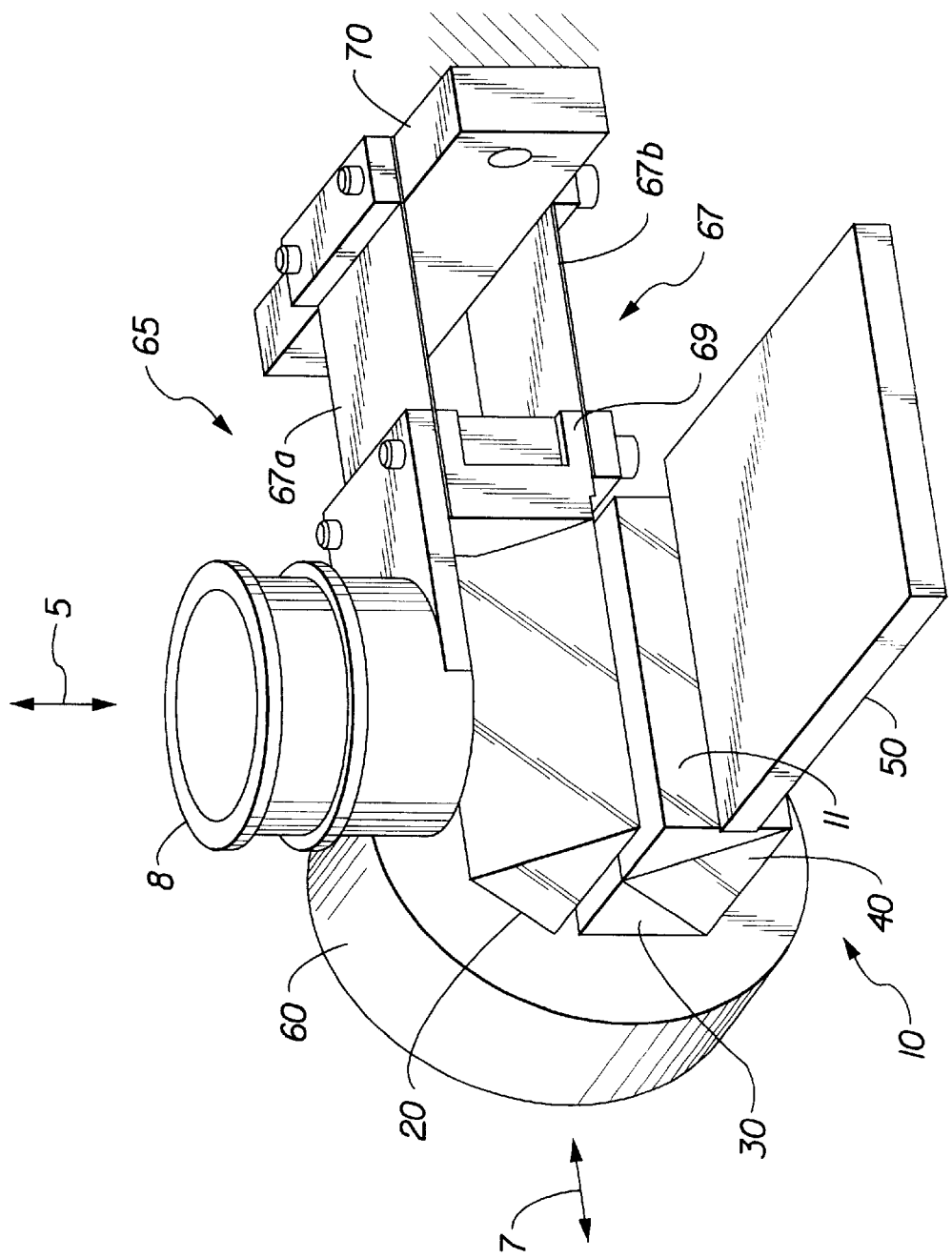
FIG. 2a is a view of the focusing apparatus illustrated in FIG. 1, having a support assembly in accordance with the present invention.

The present invention provides for a support assembly which permits a motion of moving prism 20 by utilizing an arrangement of parallel horizontal flexures. FIG. 2a illustrates a first embodiment of the support assembly of the present invention. As illustrated in FIG. 2a, focusing apparatus 10 can include a support assembly 65 for permitting a movement of prism 20 relative to the remaining elements of focusing apparatus 10. Support assembly 65 can comprise a flexure arrangement 67 which includes horizontal flexures 67a, 67b in the form of parallel sheets. The flexures can be made of any sheet metal such as stainless steel, brass, copper, etc. Horizontal flexures 67a, 67b extend in a parallel manner between a support member 69 which can be attached to prism 20 in a known manner and a fixed member 70. As further shown in FIG. 2a, support member 69 can be attached to an actuator 8 which can be a voice coil actuator. It is recognized that the utilization of support members 69, 70 as shown in FIG. 2a is one example of implementation of the present invention, and that the flexures 67a, 67b can be attached to prism 20 in a variety of known manners including directly connecting the flexures to the prism. Upon activation of actuator 8, flexures 67a, 67b permit movement of prism 20 vertically in direction 5 and is very stiff in resisting deflections in any other direction. As shown in FIG. 2a, the combination of actuator 8 and flexures 67a, 67b permit the movement of prism 20 relative to fixed prisms 11, 30, 40, fibers 50 and lens 60.

Figure 2B:
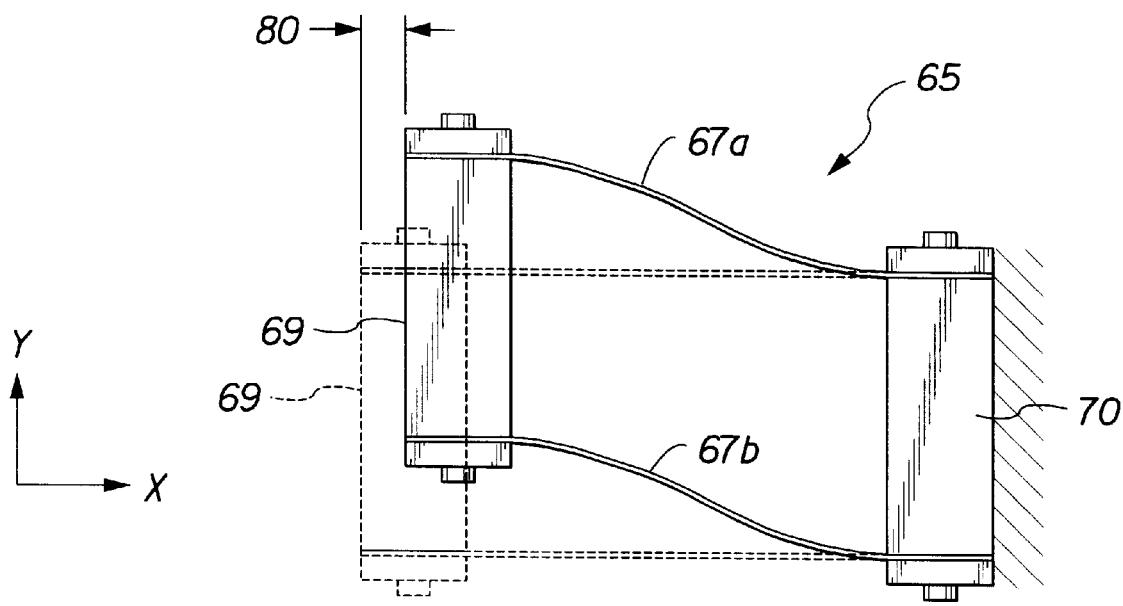

In the embodiment of FIG. 2a, foreshortening of flexures 67a, 67b is possible and may produce a small amount of motion in a direction parallel to prism axis 7 of FIG. 2a, however, this motion is of no adverse consequence since focusing apparatus 10 is axially symmetric. For illustrative purposes, the above-mentioned foreshortening effect is shown in an exaggerated manner in FIG. 2b with reference numeral 80 representing the amount of foreshortening. FIG. 2b illustrates why flexures 67a, 67b do not reach as far in the X direction when they are deflected in the Y direction (solid lines), compared to when they are undeflected (dashed lines).

Figure 2C:
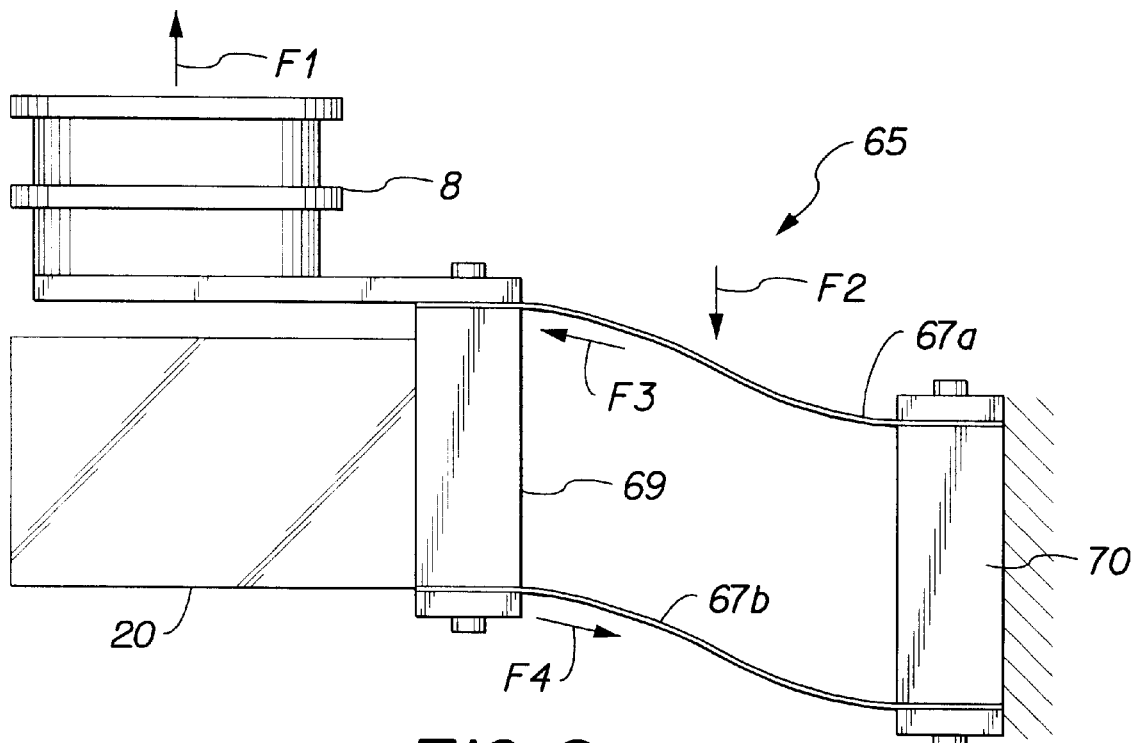

In certain situations, a small unwanted counter-clockwise rotation of prism 20 about optical axis Z can occur. FIG. 2c shows a force pattern which may cause this unwanted rotation. More specifically, when moving prism 20, actuator 8 applies a force F1 along direction 5. This force must overcome a force F2 owing to the flexural stiffness of flexures 67a, 67b. Force F2 passes through the center of the span of flexures 67a, 67b. Together, forces F1 and F2 exert a moment on focusing apparatus 10 and prism 20, which tends to rotate it counter-clockwise in the view shown in FIG. 2c. This moment is balanced by an equal and opposite reaction, comprised of forces F3 and F4, which are carried along the two flexures 67a, 67b. Although the flexures 67a, 67b are extremely stiff in resisting forces F3 and F4, they are not infinitely stiff. Force F3, a compression force, may produce a very small shortening of top flexure 67a. Force F4, a tension force, may produce a very small lifting of bottom flexure 67b. This can result in a small unwanted counter-clockwise rotation of prism 20 about optical axis Z as described above.

Figure 3:
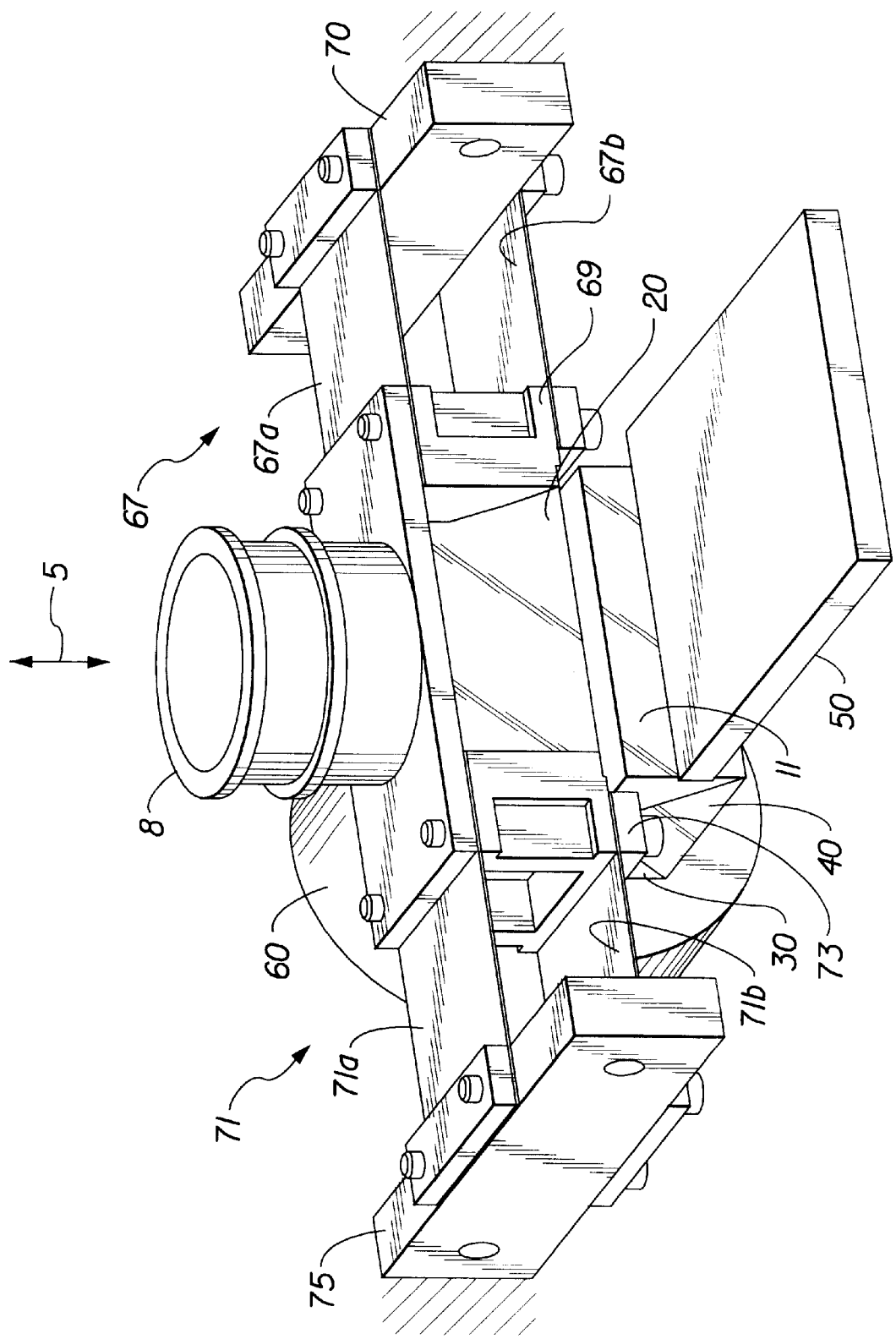
FIG. 3 is a view of a second embodiment of the focusing apparatus and support assembly of the present invention.

A second embodiment of the support assembly of the present invention which prevents an occurrence of counter-clockwise rotation as described above is illustrated in FIG. 3. In the embodiment of FIG. 3, a second flexure arrangement 71 is utilized. More specifically, second flexure arrangement 71 which includes parallel flexures 71a, 71b is symmetrically disposed on an opposite side of movable prism 20 as shown. The support assembly of FIG. 3 includes a support member 73 attached to prism 20 and a fixed member 75. Flexures 71a, 71b extend between support and fixed members 73 and 75 as shown. Because of the bilateral symmetry between flexure arrangements 67, 71, the F3–F4 force couple from flexure pairs 67a, 67b as shown in FIG. 2c are counteracted and nullified by an equal and opposite force from flexure pairs 71a, 71b. As a result, any unwanted rotation about the Z axis can be prevented.

Figure 4:
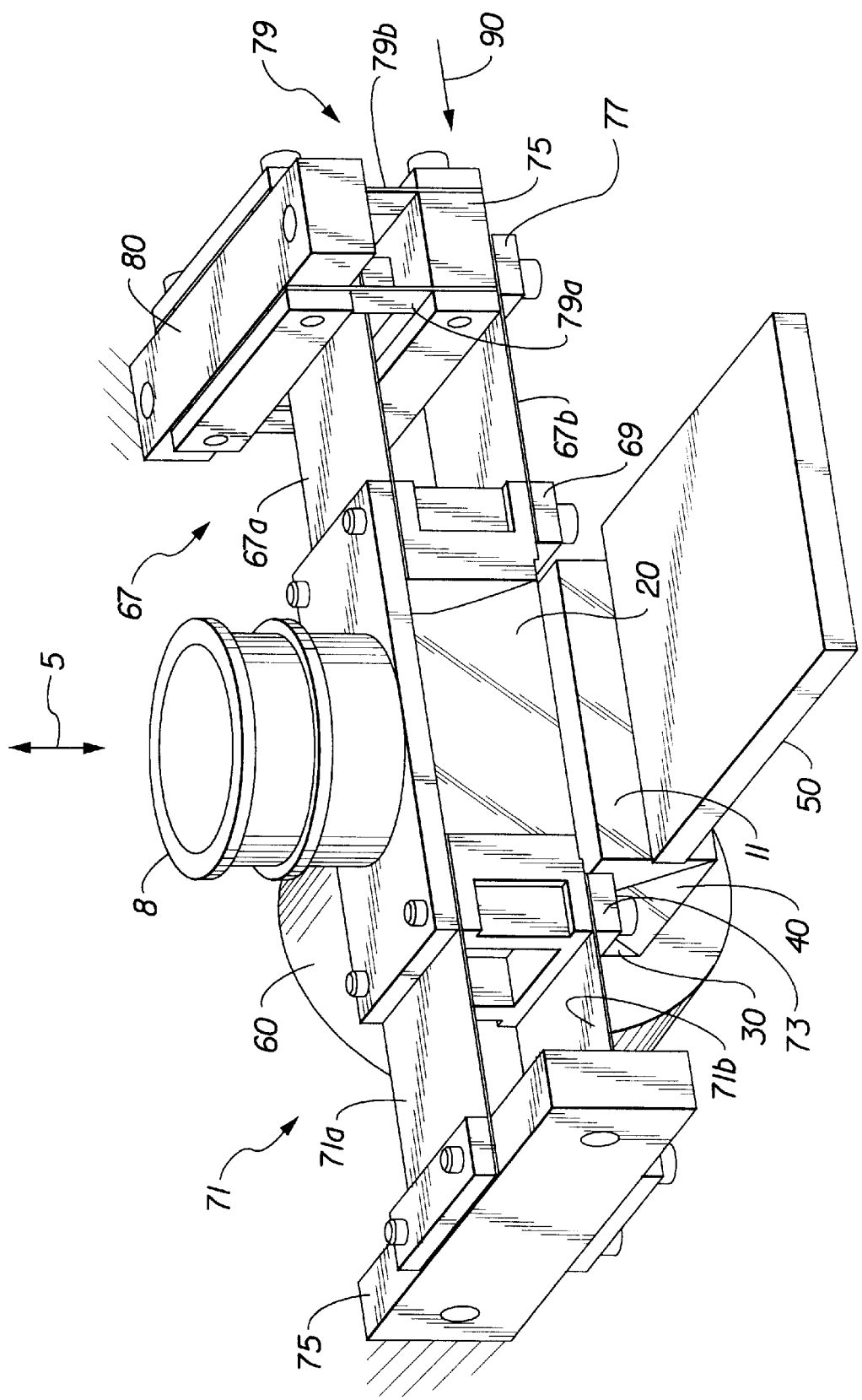
FIG. 4 is a further embodiment of a focusing apparatus and support assembly of the present invention.

FIG. 4 illustrates a third embodiment of the support assembly of the present invention. The embodiment of FIG. 4 permits a larger range of movement of prism 20 in direction 5. The embodiment of FIG. 4 is similar to the embodiment of FIG. 3 but includes a third flexure arrangement 79.

In the embodiment of FIG. 3, as actuator 8 applies a deflection force, a foreshortening of flexures 67a, 67b of flexure arrangement 67 is opposed by a foreshortening of flexures 71a, 71b of flexure arrangement 71. This may cause a kind of "tug of war" to occur between flexure arrangements 67, 70 and may have the effect of limiting the amount of travel of prism 20. In order to overcome the possibility of a foreshortening caused by the "tug of war" effect described above, the embodiment of FIG. 4 provides for a movable support member 75 and a third flexure arrangement 79. In the embodiment of FIG. 4, third flexure arrangement 79 includes flexures 79a, 79b, which extend between movable support member 75 and a fixed member 80. Support members 69 and 73, as well as members 70, 75 and 80 can be formed as plate like members and can be made of any metallic material, such as aluminum, which provides the necessary support for the prisms of the focusing apparatus, as well as the flexures. With the arrangement of FIG. 4, as actuator 8 moves up along the vertical direction 5, flexures 79a, 79b will permit a movement of movable member 75 in direction 90. This has the effect of preventing the "tug of war" between flexure arrangements 67 and 71, and increases or permits a larger range of motion in direction 5 for prism 20. Generally, within the context of the present invention, a preferred range of motion for prism 20 is approximately ±½ mm.

The invention has been described in detail with particular reference to certain preferred embodiments thereof, but it will be understood that variations and modifications can be effected within the spirit and scope of the invention.

What is claimed is:

1. A support assembly for a focusing apparatus, the support assembly comprising:
    a flexure arrangement comprised of a:
    first horizontal member and a second horizontal member parallel to said first horizontal member;
    which supports a reflecting member of the focusing apparatus, said flexure arrangement permitting a movement of the reflecting member in a first direction; and
    a second flexure arrangement, comprised of a third horizontal member and a fourth horizontal member, such that said flexure arrangement and said second flexure arrangement are symmetrically disposed on opposing sides of said reflecting member for supporting said reflecting member and permitting said movement of said reflecting member in said first direction.

2. A support assembly according to claim 1, wherein said reflecting member is a prism.

3. A support assembly according to claim 1, wherein said first direction is perpendicular to an optical axis of said focusing apparatus, and wherein movement of said reflecting member in said first direction changes a focus of said focus apparatus.

4. A support assembly according to claim 1, wherein said reflecting member moves relative to at least one fixed second reflecting member of the focusing apparatus.

5. A support assembly according to claim 4, wherein said reflecting member and said at least one fixed second reflecting member are prisms.

6. A focusing apparatus comprising:
    at least one reflecting member; and
    a flexure arrangement which supports said at least one reflecting member, said flexure arrangement permitting a movement of said at least one reflecting member in a first direction; and
    a second flexure arrangement, such that said flexure arrangement and said second flexure arrangement are symmetrically disposed on opposing sides of said at least one reflecting member for supporting said at least one reflecting member and permitting said movement of said at least one reflecting member in said first direction wherein each of said first and second flexure arrangements comprises a pair of parallel flexures.

7. A focusing apparatus according to claim 6, wherein said at least one reflecting member is a prism.

8. A focusing apparatus according to claim 6, further comprising:
    at least one fixed second reflecting member, said at least one reflecting member being movable with respect to said at least one fixed second reflecting member.

9. A focusing apparatus according to claim 8, wherein said at least one reflecting member and said at least one fixed second reflecting member are prisms.

10. A focusing apparatus according to claim 6, further comprising:
    an actuator for moving said at least one reflecting member.

11. A support assembly for a focusing apparatus, the support assembly comprising:
    a first support member attached to a first end of a reflecting member of the focusing apparatus;
    a first flexure arrangement extending from said first support member to a first fixed member;
    a second support member attached to a second end of said reflecting member; a second flexure arrangement extending from said second support member to a second fixed member;
    said first and second flexure arrangements permitting a movement of said reflecting member in a first direction; and
    wherein each of said first and second flexure arrangements comprises a pair of parallel flexures.

12. An assembly according to claim 11, wherein said reflecting member moves in said first direction relative to at least one fixed second reflecting member of said focusing apparatus.

13. An assembly according to claim 12, wherein each of said reflecting member and said at least one fixed second reflecting member are prisms.

14. An assembly according to claim 11, wherein said first direction is perpendicular to an optical axis of said focusing apparatus.

* * * * *